(12) United States Patent
Chacon et al.

(10) Patent No.: US 8,055,521 B2
(45) Date of Patent: *Nov. 8, 2011

(54) OPTIMIZED COMPONENT SELECTION FOR PROJECT COMPLETION

(75) Inventors: Terry Chacon, San Diego, CA (US); Allan R. Topp, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/149,096

(22) Filed: Apr. 25, 2008

(65) Prior Publication Data

US 2011/0010207 A1    Jan. 13, 2011

Related U.S. Application Data

(63) Continuation-in-part of application No. 11/446,202, filed on Jun. 5, 2006, now Pat. No. 7,761,317.

(51) Int. Cl.
 G06F 17/50    (2006.01)
 G06F 17/00    (2006.01)
 G06F 7/60    (2006.01)

(52) U.S. Cl. .......................... 705/7.11; 705/400; 703/2

(58) Field of Classification Search .................. 705/400, 705/1.1, 7.11, 7.12, 7.27–7.39, 28, 29, 30, 705/36 R, 37, 7.25; 703/2
See application file for complete search history.

(56) References Cited

U.S. PATENT DOCUMENTS

| | | |
|---|---|---|
| 6,826,538 B1 | 11/2004 | Kaylan et al. |
| 2005/0137959 A1 | 6/2005 | Yan et al. |
| 2005/0256778 A1 | 11/2005 | Boyd et al. |
| 2008/0091624 A1* | 4/2008 | Krikler et al. .................. 705/400 |

OTHER PUBLICATIONS

Martin J. Pring, Technical Analysis Explained, 3rd ed; p. 209; 1991 (3 pages).

* cited by examiner

Primary Examiner — Igor Borissov
(74) Attorney, Agent, or Firm — Iandiorio Teska & Coleman

(57) ABSTRACT

A method is provided for determining the best combination of components/supplies/goods matched to a price provided by a supplier of those components/supplies/goods, such that costs are minimizing subject to a given supply function, fixed costs and various considerations that can be factored into a selection criteria. More specifically, a Lagrangian function is minimized subject to the supply function and an ensemble of costing formulations are considered subject to weighting factors as applied to a variety of criteria to arrive at an optimized selection of components/supplies/goods.

13 Claims, 3 Drawing Sheets

OPTIMIZED COMPONENT SELECTION FOR PROJECT COMPLETION

This is a continuation-in-part of patent application Ser. No. 11/446,202 filed Jun. 5, 2006 now U.S. Pat. No. 7,761,317.

BACKGROUND

Selection of supplies from a collection of suppliers, given a host of variable considerations, can be a daunting task. Often, as the size of a production project increases, so does the general complexity. Component reliability, component performance, supplier reputation, price, quantity requirements, second and/or third supply source availability, and maintenance support all figure prominently in product and supplier selection. Given constraints based on these factors, a method, system and apparatus are needed in order to ensure that selection of products and suppliers are optimized.

Figure 1:
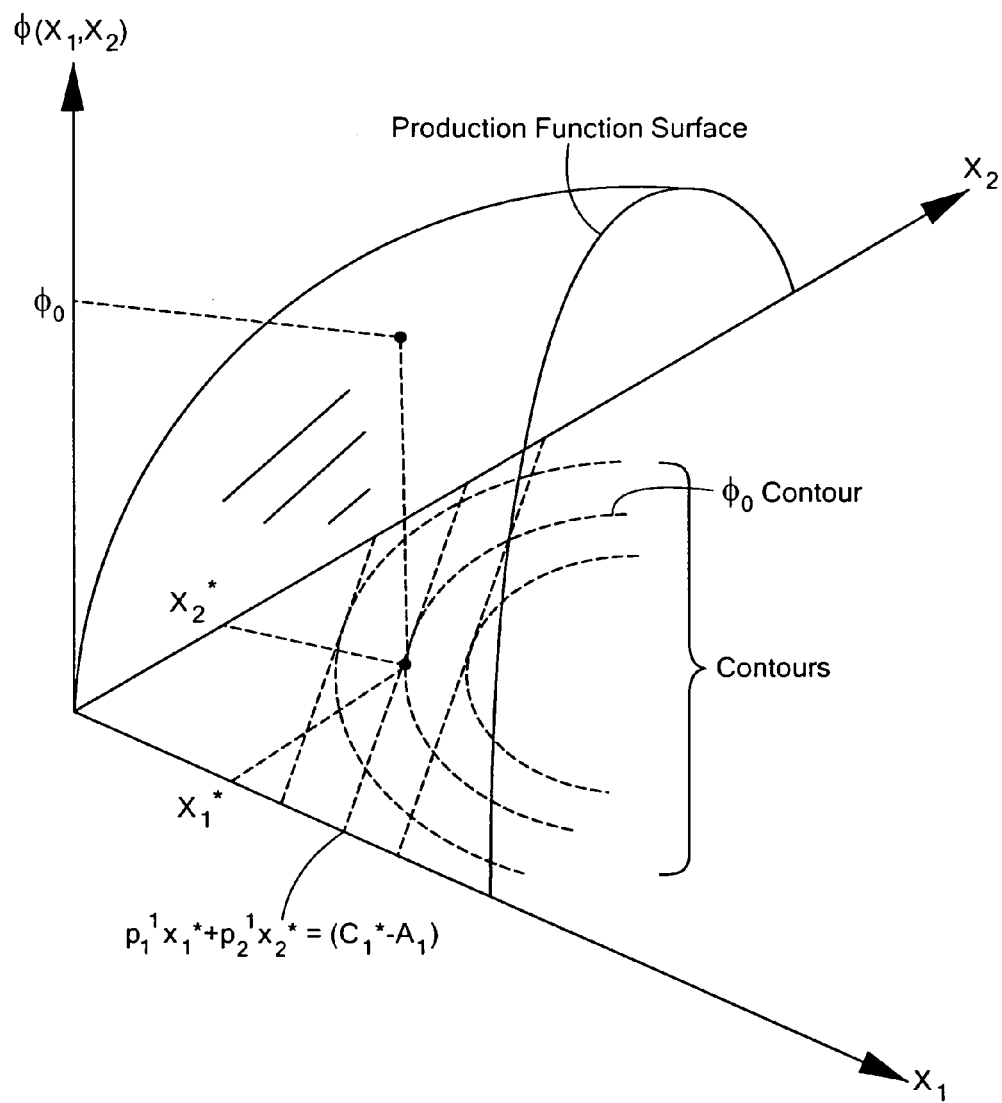
FIG. 1 illustrates a graph in three dimensions showing a production function optimized at a certain quantity level $\Phi_0$.

Applicable reference numbers and symbols have been carried forward.

DETAILED DESCRIPTION

Quantities and prices of components or goods used to complete a project can be expressed as a function of production. For instance, $C = p_1 x_1 + p_2 x_2 + \ldots p_n x_n$, where C represents cost, the subscripted p represents price, and the subscripted x represents inputs, (e.g., components/goods/supplies) for purchase. The foregoing equation is representative of variable costing involved with producing a product. Fixed cost can be represented by A in a general cost formula, e.g. $C = p_1 x_1 + p_2 x_2 + \ldots p_n x_n + A$. Inputs can be further represented in a column vector x belonging to Euclidian n-space, $E^n$, as quantities of a given input. Column vector p can represent prices associated with a given input x, and these prices are assumed to be essentially constant for different quantities of x. The expenditure on input x can be represented by p' x where p' is the transpose of p. For a given $\Phi(x)$ of product output, subject to the above general cost function, $\Phi_i = \partial\Phi/\partial x_i > 0$ for all $i=1, \ldots, n$ inputs and $\Phi_{ij} = \Phi_{ji}$ for second partial derivatives with $\Phi_{ii} < 0$ for all i. In other words, $\Phi(x)$ is a strictly concave function (bounded from above) due to diminishing returns.

Several constraints must be accounted for in optimizing a purchase of inputs including future product alterations, evolving technology and the fact that certain inputs may become non-procurable when replacement spares are required. Consequently, sourcing of inputs must be considered from several suppliers noting that a given level of product output may constrain obtaining inputs in varying quantities from various suppliers. Pricing formulation inclusive of the sum of the mathematical products of inputs and prices from a particular supplier or from among various suppliers to achieve the sourcing necessary to produce a given level of product output $\Phi(x)$, can be grouped in sets referenced herein as ensembles. In optimizing the purchase decision for a group of inputs x, k (an integer) ensembles can be considered according to the variable costing given by the following vector products.

$(p^1)' x$ = expenditure to meet requirements using ensemble 1.

$(p^2)' x$ = expenditure to meet requirements using ensemble 2.

...

$(p^k)' x$ = expenditure to meet requirements using ensemble k.

Note that the superscripted vectors, such as vector $(p^k)'$, represent the transpose of vector p from the $k^{th}$ ensemble.

An ensemble can be representative of the sum of the products of prices and inputs from a single supplier or alternatively, an ensemble can be representative of the sum of the products of prices and inputs from more than one (e.g., numerous) supplier.

Fixed costs can be accounted for within ensemble representations as follows:

$A_1$ = Fixed cost for ensemble 1.
$A_2$ = Fixed cost for ensemble 2.
...
$A_k$ = Fixed cost for ensemble k.

Costs $A_i$, $i=1, \ldots k$ are costs that, in general, are calculated externally from a given project production problem, i.e., these costs are considered to be exogenous.

The total cost or expenditure associated with ensembles i through k can be expressed as follows:

$$C_1 = A_1 + (p^1)' x.$$

$$C_2 = A_2 + (p^2)' x.$$

...

$$C_k = A_k + (p^k)' x.$$

The problem to be solved involves finding the minimum costing ensemble, given constraints that can be accounted for by appropriate weighting factors, subject to production function $\Phi(x)$ which determines the level of output to be produced, e.g. 100 cars, 2 ships, 500 television sets, 15 weapons systems, 30 missile systems, 40 tanks, 60 pickup trucks, etc. Therefore, it is necessary to minimize the following cost formula for $C_m$:

$C_m = A_m + (p^m)' x$, subject to $\Phi(x) = \Phi_0$, for each ensemble $m=1, \ldots k$ where $\Phi_0$ is a predetermined or given level of product output.

This problem can be transformed from finding a minimum to finding a maximum by negating both sides of the equation, resulting in the following:

$$-C_m = -A_m - (p^m)' x, \text{ subject to } \Phi(x) = \Phi_0$$

Forming the Lagrangian function for the forgoing results in $$L(x,\lambda) = -A_m - (p^m)' x + \lambda[\Phi(x) - \Phi_0]$$

First order conditions for maximization require the following, given n inputs:

$$\partial L/\partial \lambda = \Phi(x) - \Phi_0 = 0 \text{ and}$$

$\partial L/\partial x = (p^m) - \lambda \nabla_x \phi(x) = 0$, where $\nabla_x$ is the gradient vector with respect to x, and there are $m=1, \ldots k$ solutions.

For each ensemble $m=1, \ldots k$, $\partial L/\partial x$ can be rewritten as $$\partial L/\partial x_1 = p_1^m - \lambda \partial\phi/\partial x_1 = 0 \quad\quad 1)$$

$$\partial L/\partial x_2 = p_2^m - \lambda \partial\phi/\partial x_2 = 0 \quad\quad 2)$$

...

$$\partial L/\partial x_n = p_n^m - \lambda \partial\phi/\partial x_n = 0 \quad\quad n)$$

$\partial L/\partial x = (p^m) - \lambda \nabla_x \Phi(x) = 0$ implies that $\lambda = (p_i)^m/\Phi_i$ for all i, j=1 . . . , n components. Consequently, $(p_i)^m/\Phi_i = (p_j)^m/\Phi_j$ or alternatively, $(p_i)^m/(p_j)^m = \Phi_i/\Phi_j$. Further, this also implies that a set of marginal productivities $\Phi_i(x)$ are in the same proportion as the corresponding ratio of item prices $(p_i)^m$ belonging to each ensemble m, (m=1, . . . k). Marginal product $\Phi_i$ is defined as the change in output $\Phi$ resulting from a unit change in input $x_i$. The equations $\partial L/\partial \lambda = \Phi(x) - \Phi_0 = 0$ and $\partial L/\partial x = (p^m) - \lambda \nabla_x \Phi(x) = 0$ (i.e., equations 1) through n) above) can be solved for n inputs $(x_1, \ldots x_n)$ for each ensemble m (m=1, . . . k), resulting in a demand function where, $(x_i^m)^* = (x_i)^m(\Phi_0, A_m, (p_1)^m, \ldots, (p_n)^m)$ for i=1, . . . n, inputs. This demand function includes a given product output level $\Phi_0$, fixed cost $A_m$ and prices $p_i$ for ensemble m=1, . . . k.

In order to ensure a minimum for cost formula $C_m$ subject to the constraint $\Phi(x) = \Phi_0$, the first derivative of the Lagrangian must be equal to zero as prescribed by first order conditions for maximization noted above, while the second differential $d^2L$ of the Lagrangian must be positive definite for all $dx_i$, i=1, . . . n, not all zero, such that $\Delta x' \nabla_x \Phi(x) = 0$. It should be noted that unless the production function is held to a fixed level then $(p_i)^m/\Phi_i = \lambda = \partial C_m/\partial \Phi$ = a marginal cost, i.e., a change in cost will result in a unit change in output.

FIG. 1 is a graph in three dimensions that shows a production function optimized at a certain production quantity level $\Phi_0$, illustrative of the foregoing with cost formula $C_m$ minimized for a single ensemble m=1 with only two inputs $x_1$ and $x_2$ and where $\Phi(x_1, x_2)$ is a concave function in three-space. Expenditures or cost of the inputs is $C_1 = A_1 + (p_1)^1 x_1 + (p_2)^1 x_2$, where $A_1$ is a fixed cost. As shown in FIG. 1, $\Phi(x_1, x_2)$ is the shell-like surface above the $(x_1, x_2)$ plane. The cost or expenditure for selected values of $C_1$ and $A_1$ are straight lines $(p_1)^1 x_1 + (p_2)^1 x_2 = C_1 - A_1$ on that plane. Equal output level contours of $\Phi(x_1, x_2)$, shown as a map in the $(x_1, x_2)$ plane are determined by projecting downward the intersections of parallel, level planes (corresponding to selected levels of output $\Phi$) with the shell surface. The given output level $\Phi_0$ is shown as a particular point on the surface. The dashed line projected from $\Phi_0$ down to the $(x_1, x_2)$ plane necessarily intersects the contour corresponding to that output level, i.e. the $\Phi_0$ contour. The tangent point of one of the cost lines with the $\Phi_0$ contour determines the optimum values of x1 and x2 that meet the requirements for minimum $C_1$. Minimum $C_1$ is denoted by $C_1^*$ at $x_1^*$ and $x_2^*$.

Prices $p_1^1$ and $p_2^1$ are fixed for ensemble m=1, so that a series of values for C1-A1, yields a set of cost or expenditure lines for each of the selected values shown as parallel lines on the $(x_1, x_2)$ plane in FIG. 1. Lower costs can be observed nearer the origin. The slopes of the straight lines shown are readily determined by forming the first derivative of the cost function. The result is $(p_1)^1 dx_1 + (p_2)^1 dx_2 = 0$, from which the slope $dx_2/dx_1 = -(p_1)^1/(p_2)^1$ for any cost line. The optimum solution point occurs where the slope of the $\Phi_0$ contour equals the slope $-(p_1)^1/(p_2)^1$ of the cost lines. In order to find the slope of the $\Phi_0$ contour, let $\Phi(x_1, x_2) = \Phi_0$ and take the first derivative of this expression to get $\Phi_1 dx_1 + \Phi_2 dx_2 = 0$. Next, solve for the slope $dx_2/dx_1 = -\Phi_1/\Phi_2$ of the contour. The optimum solution occurs where $(p_1)^1/(p_2)^1 = \Phi_1/\Phi_2$.

Optimized selection of an ensemble from among a plurality of ensembles must be accomplished with regard to minimized costs while accounting for other facts and circumstances. For instance, a decision involving input selection should also consider the technical performance of the inputs (e.g., the components/goods/supplies). Technical performance factors can include performance considerations of an input provided by a particular supplier of said input, input quality, input features, etc. Additionally, the reliability and maintainability (known together as supportability) of input factors should be included in the selection process. Numerous other criteria can be considered as well. Assigning a percentage weight to each factor in relation to points, cost, etc. allows a variety of considerations to be accounted for in an optimization selection.

A utility table as shown below, in Table 1, can be constructed in order to rank ensembles according to various criteria considerations. For instance, a decision can be weighted for major criteria and sub criteria considerations. As shown in Table 1, technical performance points are given an overall major criteria weight of 35%. Management (Schedule, Risks) points account for a major criteria weight of 30%. Management points can account for various risk factors according to subcategories relating to scheduling and risk assumption such as supplier reliability, second source availability, service options, etc. Within each major criterion, the factors under consideration must account for a combined total of 100% of the allocation accorded the major criteria. Consequently, as shown in Table 1, subcategories 1 through 4 must account for 100% of the 30% weight accorded the major criteria weight of 30% for management (schedule, risk) points. As shown, subcategory 1 is accorded 10%, subcategory 2 is accorded 15%, subcategory 3 is accorded 50%, and subcategory 4 is accorded 25%. Technical performance points can account for a variety of technical performance considerations designated KPP1 through KPP4 in FIG. 1. The technical performance point subcategories must account for 100% of the technical performance point allocation. Consequently, in Table 1, subcategories KPP1 through KPP4 must account for 100% of the 35% technical performance point allocation. As shown, of the 35% technical performance points allocation, KPP 1 is accorded 20%, KPP2 is accorded 15%, KPP3 is accorded 40% and KPP4 is accorded 25%. The ranking among ensemble considerations are also accorded a major criteria weight. In Table 1, ensembles 1 through k (i.e. for Ensembles m=1, . . . , k) are given a 35% weight. The major criteria weights must total 100% overall. This occurs within Table 1 since the 35% weight accorded the ensembles, the 30% weight accorded management points and the 35% accorded technical performance points total 100%. Total Ownership Cost (TOC) is one of the major criteria that must be considered in achieving customer satisfaction. TOC has four major cost subcategories: Development, Procurement/Production, Operations and Support, and Disposal costs. These subcategories are usually estimated separately and only the total amount (TOC) receives a criterion weight. The reason TOC is an important consideration is the simple fact that a good technical design with lowest production costs, though certainly desirable, must also be supportable as well. Otherwise the design will almost certainly lead to one of high operating costs. Thus in considering costs, production cost alone is not sufficient to help ensure customer satisfaction. Over time, operating and support costs are normally greater than acquisition cost and so must weigh into the selection decision process.

A utility score (i.e., U score) is calculated for each major criteria. For instance, in Table 1 the U score for technical performance points can be determined from an integer score spread between 0 and 10, inclusive. Integer points are assigned for each technical performance category associated with a particular ensemble. As shown in Table 1, KPP1 is assigned a point total of 8 in ensemble 1 and a point total of 7 in ensemble k. The high score is designated the lowest upper bound (LUB) while the low score is designated the greatest lower bound (GLB). LUB is further abbreviated as H as GLB is abbreviated as L. The GLB and LUB are subjective determinations although in certain cases they can be arrived at through quantitative methods, but care must be observed to avoid introducing a bias in the selection process. A weighted total is calculated for ensembles according to KPP points and weights. The utility score for technical performance points can be determined according to the following formula:

$$U\ \text{score} = 100\% \cdot (\text{Sum of the products of subcategory weights by assigned subcategory integer points} - L)/(H-L).$$

However, this formulation of a utility score is by no means the sole methodology available to calculate a U score and other methods are therefore possible.

In order to calculate a utility score for each ensemble cost, a LUB is assigned. This number is at least as great (but can be absolutely greater) than all of the calculated minimum costs associated with each ensemble. Likewise, a GLB is assigned which is at most (but can be absolutely) less than all of the calculated minimum costs associated with each ensemble. In Table 1, $20,000 is shown as the LUB (H) while $6,000 is shown as the GLB (L). A utility score for the cost ensembles is calculated as follows:

$$U\ \text{Score} = 100\% \cdot (H - TOC_m)/(H-L).$$

As with the previously discussed U score, a U score for cost can be calculated according to other methods. TOC, a subscripted value, stands for total opportunity cost. TOC may be defined as costs representative of total costs, including fixed, variable and supportability costs, or a significant portion thereof. Supportability costs include operations and support costs which are maintenance and operations related costs incurred for an input over the life cycle of the input in a system using the input.

The utility score for management (schedule, risk) points is determined by assigning a point total, between an LUB and GLB for each management point subcategory within an ensemble. As before, the LUB and GLB are subjective determinations appropriate to the problem at hand. Subcategory weights are multiplied by there respective points assigned to a particular ensemble. A weighted total is achieved for each ensemble and the utility score is calculated as follows:

$$U\ \text{Score} = 100\% \cdot (\text{subcategory weighted total points} - L)/(H-L).$$

Once again, other methods can be used to calculate a utility score base on management points.

The utility scores are summed in proportion to their major criteria weight values, resulting in a value referred hereinafter as a Figure of Merit (FOM). Other calculations of FOM are possible as determined by other formulations, for example, integer score spread between 0 and 10 is convenient, but is not required (perhaps 0 to 5 is more appropriate for a particular problem). Among the FOM values, the highest such value is indicative of the optimum ensemble choice. Among the three ensembles shown with values in Table 1, ensemble k at 80.64% is the optimal ensemble choice to provide the calculated inputs $x_1, \ldots x_n$.

Figure 2:
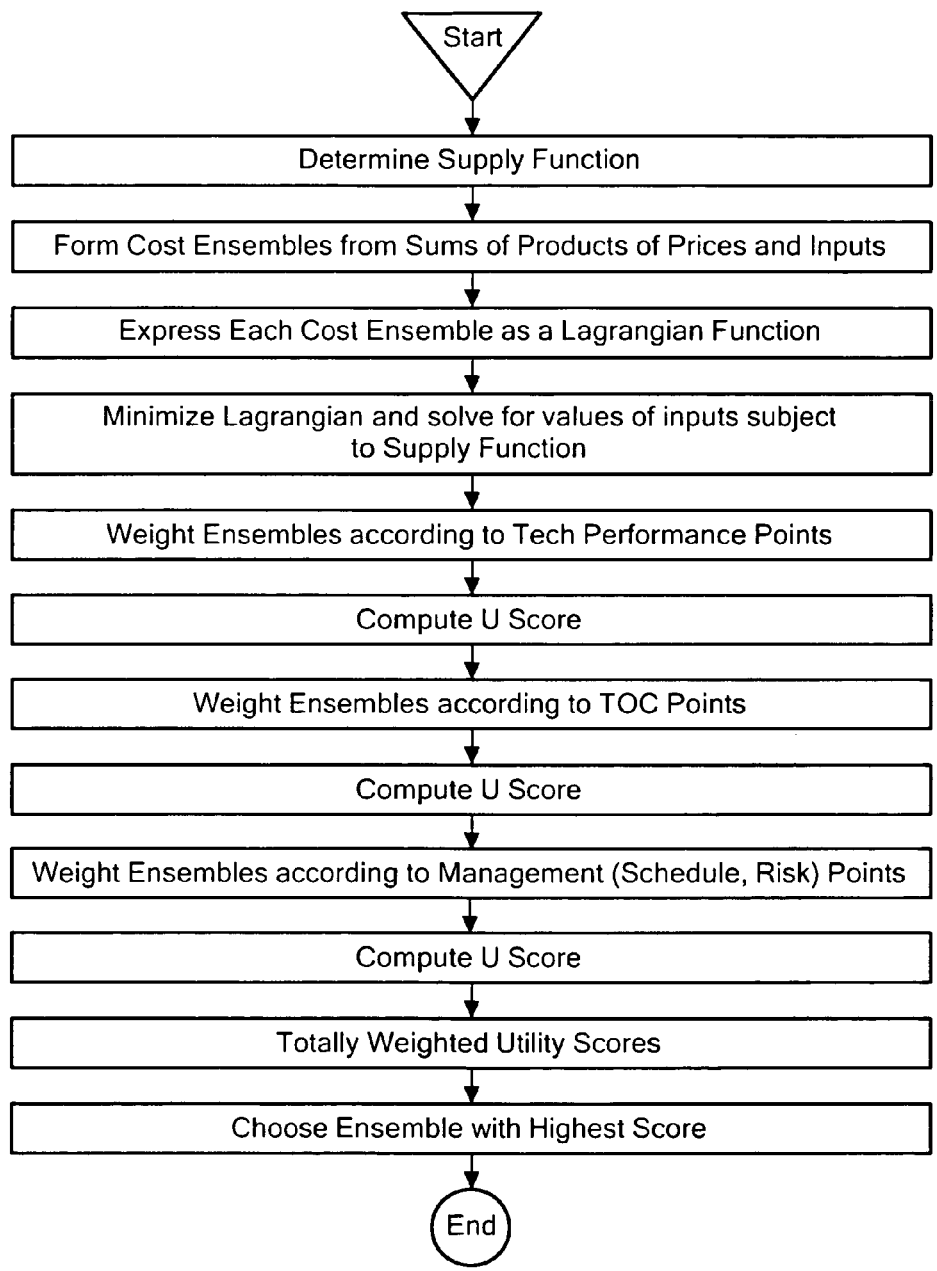
FIG. 2 illustrates a flowchart which summarizes the methodology of the invention.

FIG. 2 illustrates a flowchart which summarizes the foregoing methodology discussed herein.

Figure 3:
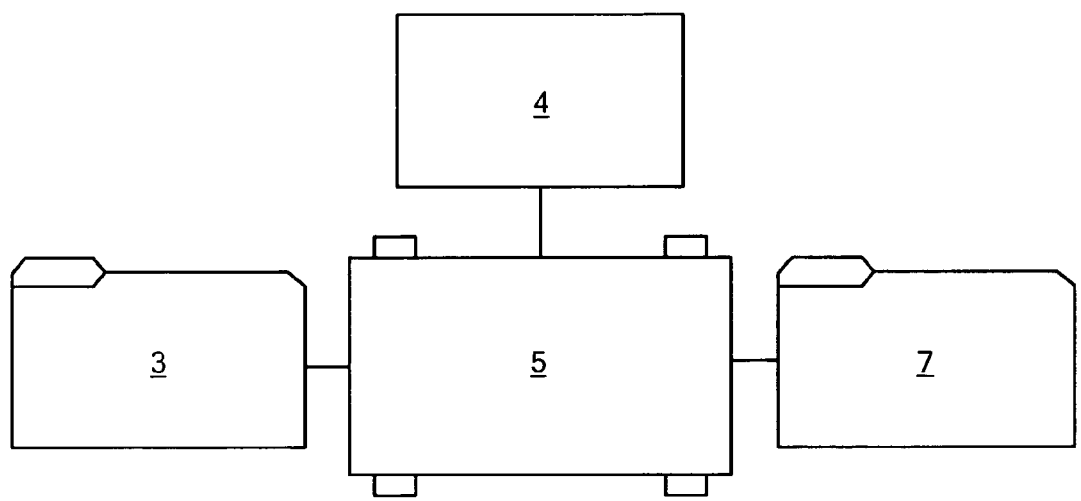
FIG. 3 illustrates a diagram of a system capable of implementing the e selection methodology according to the invention.

FIG. 3 illustrates a diagram of a system capable of implementing the above selection method. Ensembles composed of inputs according to a single supplier or multiple supplies are provided in electronic file 3. Computer 5 which can be a server, laptop computer, desktop computer, etc. is programmed to find and minimize the Lagrangian formulas associated with each ensemble. Computer 5 may be programmed using one or more types of computer readable media 4, as described herein further below. Computer 5 is also programmed to calculate the appropriate major criteria and sub-criteria weights and provide U scores culminating in a FOM in accordance with Table 1. This information is saved and output to file 7 which contains information of the type found in Table 1 along with a selected optimized ensemble choice.

TABLE 1

Sample Utility Table Template for Calculation of FOM

| Major Criteria | Major Criteria Weight | Sub Criteria Weight | LUB = H | GLB = L | Ensemble 1 | Ensemble 2 | ... | Ensemble k |
|---|---|---|---|---|---|---|---|---|
| Tech Performance Points (KPP) | 35% | | 10 | 2 | | | | |
| KPP 1 | | 20% | | | 8 | 5 | | 7 |
| KPP 2 | | 15% | | | 10 | 7 | | 8 |
| KPP 3 | | 40% | | | 9 | 3 | | 10 |
| KPP 4 | | 25% | | | 7 | 8 | | 6 |
| Weighted Total | | 100% | | | 8.45 | 5.25 | | 8.10 |
| U score | | | 100% | 0% | 81% | 41% | | 76% |
| Ensemble$_m$ Total Cost Pts. (TOC$_m$) | 35% | | $20,000 | $6,000 | $9,700 | $8,900 | | $8,020 |
| U score | | | 0% | 100% | 74% | 79% | | 86% |
| Management (Schedule, Risk) Points | 30% | | 10 | 3 | | | | |
| Subcategory 1 | | 10% | | | 8 | 5 | | 9 |
| Subcategory 2 | | 15% | | | 8 | 7 | | 8 |
| Subcategory 3 | | 50% | | | 9 | 9 | | 10 |
| Subcategory 4 | | 25% | | | 7 | 4 | | 6 |
| Weighted Total | | 100% | | | 8.25 | 7.05 | | 8.60 |
| U Score | | | 100% | 0% | 75% | 58% | | 80% |
| Total | 100% | | | | | | | |
| FOM | | | | | 76.47% | 59.33% | | 80.64% |

The foregoing has all manner of applications including that of providing a methodology for determining suppliers and minimizing costs given a variety of constraints in connection with submission of government contract bids, particularly in the area of Department of Defense (DOD) procurement. Specifically, the methodology can optimize selections from among commercial off the shelf (COTS) components/goods/supplies and Government off the shelf (GOTS) components/goods/supplies, defined herein as non-developmental items (NDI). Further, the methodology can be applied to situations where Government Participating Acquisition Resource Managers (PARMS) are the primary sources of NDIs for purchase. Moreover, the methodology set forth has applicability to commercial production problems concerning the purchase of acceptable components/goods/supplies at the lowest cost within a number of constraints.

In one or more exemplary embodiments, the functions described herein may be implemented in software, hardware firmware or a combination thereof. If implemented in software, the functions may be stored or transmitted using instructions or code on a computer-readable media. Computer readable media, as used throughout herein includes computer storage media and communication media including medium involving the transfer of a computer program between one or more sites. Storage media includes media that may be accessed by a computer such as random access memory (RAM), read only memory (ROM), electrically erasable programmable read only memory (EEPROM), CD-ROM, flash memory, optical disk magnetic disk or other magnetic storage device.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A non-transitory computer readable medium comprising:
   instructions for causing a computer to compose a plurality of ensembles each comprising products of inputs with product prices for calculation of costs;
   instructions for causing a computer to determine a Lagrangian function for each ensemble from said plurality of ensembles;
   instructions for causing a computer to minimize each said Lagrangian function subject to constraints of a supply function and solving for values of inputs for each ensemble;
   instructions for causing a computer to compute a first utility score for ranking ensembles based on solved values of inputs;
   instructions for causing a computer to weigh ensembles according to a first set of criteria;
   instructions for causing a computer to compute a second utility score for ranking ensembles weighted according to the first set of criteria;
   instructions for causing a computer to weigh each utility score according to predefined values;
   instructions for causing a computer to calculate a sum of weighted utility scores associated with a particular ensemble; and
   instructions for causing a computer to select an ensemble according to the highest weighted utility score sum.

2. A computer readable medium as recited in claim 1 further comprising: instructions for causing a computer to weight ensembles according to a second set of criteria; instructions for causing a computer to compute a utility score for ensembles weighted according to said second set of criteria.

3. A compute readable medium as recited in claim 1 wherein said inputs are selected from a group consisting of components, goods, supplies or a combination thereof.

4. A computer readable medium as recited in claim 1 wherein said first set of criteria concerns technical performance factors relating to said inputs.

5. A computer readable medium as recited in claim 4 wherein said technical performance factors consist of performance considerations of an input received from a particular supplier of said input, input quality, input features and combinations thereof.

6. A computer readable medium as recited in claim 2 wherein said second set of criteria concerns management factors relating to said inputs.

7. A computer readable medium as recited in claim 6 wherein said management factors are selected from the group consisting of supplier reliability, second source availability, service options and a combination thereof.

8. A computer readable medium as recited in claim 1 wherein each said ensemble includes inputs received only from a sole supplier.

9. A computer readable medium as recited in claim 1 wherein each said ensemble includes inputs received from multiple suppliers.

10. A computer readable medium as recited in claim 1 wherein said predefined values are subjectively determined.

11. The computer readable medium as recited in claim 1 wherein said products of inputs are received from at least one supplier.

12. The computer readable medium as recited in claim 1 wherein said first utility score relates to a cost of the ensemble.

13. The computer readable medium as recited in claim 1 wherein said first set of criteria is selected from technical performance factors relating to said inputs and management factors relating to said inputs.

* * * * *